Jan. 14, 1958 W. S. PRAEG 2,819,532
GEAR CHECKER
Filed Aug. 15, 1955

INVENTOR.
WALTER S. PRAEG
BY Whittemore,
Hulbert & Belknap
ATTORNEYS

United States Patent Office 2,819,532
Patented Jan. 14, 1958

2,819,532

GEAR CHECKER

Walter S. Praeg, Detroit, Mich., assignor to National Broach & Machine Company, Detroit, Mich., a corporation of Michigan Application August 15, 1955, Serial No. 528,212

8 Claims. (Cl. 33—179.5)

The present invention relates to a gear checker and more particularly, to gear checking apparatus designed to check relatively large gears such for example as marine gears.

It is an object of the present invention to provide simple gear checking apparatus designed to effect a quick and accurate check of the helix angle or lead of the gear teeth, as well as an indication of concentricity or taper of the gear.

More specifically, it is an object of the present invention to provide a gear checking apparatus comprising a rack movable radially of a gear to be checked, means for shifting the rack while it is traversed in contact with the teeth of the gear in a direction parallel to the axis of the gear, and additional means providing for movement of the rack in a direction perpendicular to the axis of the gear and tangential to the pitch cylinder of the engaged tooth as a consequence of its movement in a direction parallel to the axis of the gear.

Other objects and features of the invention will become apparent as the description proceeds, especially when taken in conjunction with the accompanying drawings, wherein.

Figure 1:
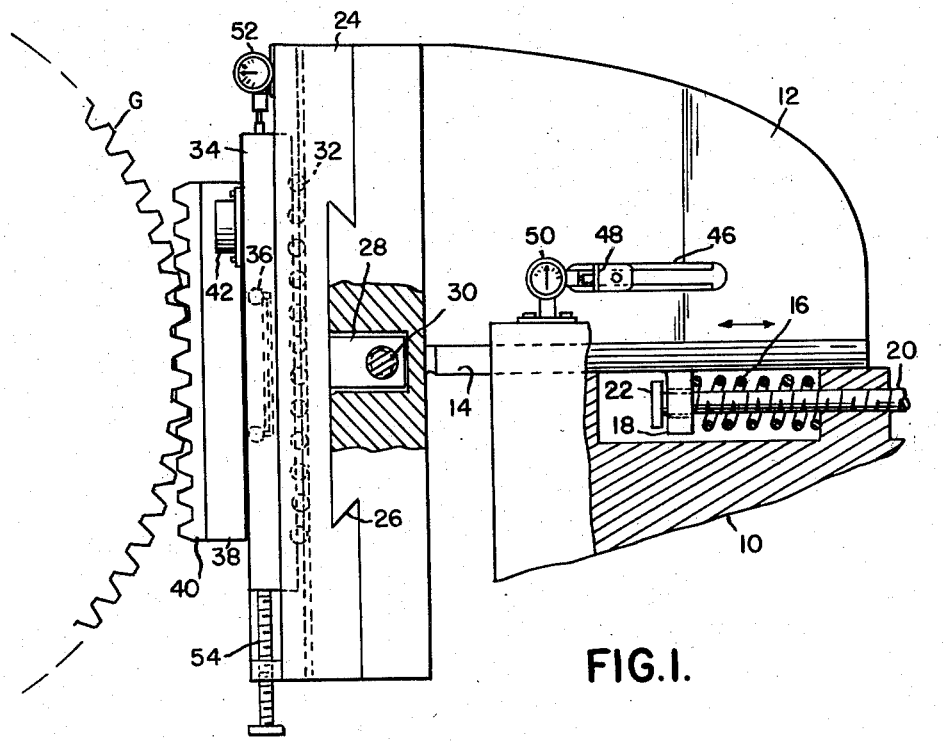
Figure 1 is a side elevation of gear checking apparatus, partly in section.
Figure 2:
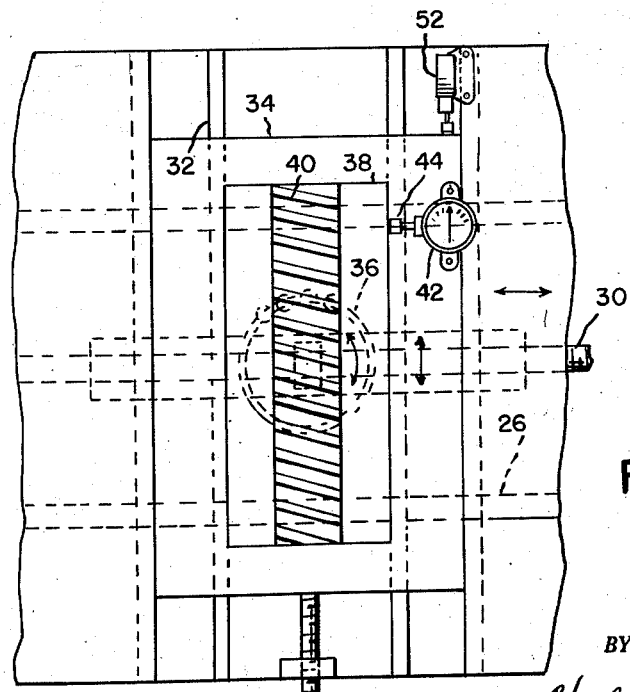
Figure 2 is a fragmentary front elevational view of gear checking apparatus.

The apparatus comprises a stationary support 10 and where the gear checking apparatus is associated with a gear finishing machine, such as a gear shaving machine, the support 10 may be a part of the base or frame of the gear shaving machine. In many cases it is desirable to check the gear for accuracy while it remains in the finishing machine so that if inaccuracies are determined, they may be corrected before removal of the gear from the machine. Secondly, in dealing with gears of the size for which the present apparatus is designed, it is desirable to check the gears while they are supported for the shaving operation since the weight of the gears may lead to apparent inaccuracies if supported in different mechanism.

In any case, mounted on the stationary base or support 10 is a carriage 12, suitable ways being indicated generally at 14. The carriage 12 is in the present instance movable horizontally toward and away from the work gear G which is illustrated as being supported with its axis horizontal. The carriage 12 is advanced toward the gear G by suitable resilient means such as the compression spring 16 and the spring bears against a depending lug 18 so as to maintain a rack, later to be described, in pressure contact with the teeth of the gear. In order to retract the carriage 12 the base is provided with a screw 20 extending through an opening in the lug 18 and having a head 22 engageable with the lug to retract the carriage against the force of the spring 16. When the apparatus is engaged with the gear G the screw is advanced to a point where the carriage 12 may be movable radially either toward or away from the gear G in accordance with characteristics or errors of the gear being checked.

Mounted on the front face of the carriage 12 is a slide 24 mounted for horizontal movement in a direction parallel to the axis of the gear G in ways indicated diagrammatically at 26. The slide 24 has a rearwardly extending lug 28 provided with a threaded opening receiving a feed screw 30 which may be rotated by hand to accomplish horizontal movement of the slide 24.

The slide 24 is in turn provided with vertically extending ways indicated diagrammatically at 32 preferably of the ball bearing type as suggested in Figure 1, and mounted in these ways for vertical movement is a sub-slide 34. The sub-slide 34 in turn is provided with annular ways 36 preferably of the ball bearing type as indicated in the figures, for the reception of a gauge carrier 38 which is adapted to receive and rigidly support a gauge in the form of a relatively narrow elongated master rack element 40.

From the foregoing it will be observed that when the carriage 12 is advanced the teeth of the rack 40 may be engaged with the teeth of the gear G. If the teeth of the gear G at the point of engagement with the rack are of incorrect helix angle, the rack will be rotated bodily about a horizontal axis concentric with the ways 36 and this angular movement of the rack is of course imparted to the gauge carrier 38. Mounted on the sub-slide 34 is an indicator 42 having a plunger 44 in abutment with a side of the carrier 38, so that lead or helix angle error of the gear is immediately indicated on the indicator 42. The carrier 38 may of course be adjusted to zero position by suitable gauge blocks at which time indicator 42 may be set to zero, so as to obtain an accurate reading of helix angle error.

The carriage 12 is provided with a horizontally extending slideway 46 in which is adjustably received an abutment element 48 and mounted on the stationary part of the base 10 is another indicator 50. When the carriage 12 is advanced so that the rack 40 is in full meshing engagement with the teeth of the gear G, the abutment 48 may be brought into engagement with the plunger of the indicator 50. It will be recalled that the screw 20 is advanced to provide freedom of movement of the carriage 12. Accordingly, as the main slide 24 is traversed axially of the gear, indicator 50 will indicate taper of the master gear. Also, by effecting readings at different points around the gear G, the indicator 50 may be employed to indicate concentricity of the gear.

It is intended that the apparatus be employed primarily with relatively large gears, such for example as herringbone marine gears. Accordingly, the teeth of the gear G at the portion of the gear being checked in the event that it is a herringbone gear, will be helical. In this case the teeth of the rack 40 will likewise be helical. With this arrangement, traverse of the main slide 24 parallel to the axis of the gear will result in vertical movement of the sub-slide 34 and it is for this purpose that the vertical ball bearing ways 32 are provided.

In case the gear G being checked is a spur gear, another indication of accuracy as to zero lead may be provided by an indicator 52 carried by the main slide 24 and having a plunger bearing against one end of the sub-slide 34. If the teeth of the gear G are truly aligned with its axis, traverse of the rack parallel to the axis of rotation of the screw 30 will result in a continuous zero indication of the indicator 52.

A suitable adjustable abutment indicated at 54 is provided engaging the lower end of the sub-slide 34 to prevent its downward movement when disengaged from the teeth of the gear G after having been elevated by horizontal travel of the main slide 24.

The drawings and the foregoing specification constitute a description of the improved gear checker in such full, clear, concise and exact terms as to enable any person skilled in the art to practice the invention, the scope of which is indicated by the appended claims.

What I claim as by invention is:

1. Gauging apparatus for large gears comprising a frame, a rotary gear support on said frame for mounting a large gear to be gauged in fixed position during the gauging operation, a carriage movable on said frame radially of said gear support, a slide movble on said carriage in a direction parallel to the axis of the gear, manually operated traverse means for traversing said slide on said carriage, a sub-slide movable on said slide during traverse thereof in a direction perpendicular to the gear axis and perpendicular to the direction of movement of said carriage, a swivel plate freely movable on said sub-slide during traverse of said slide about an axis parallel to the direction of movement of said carriage, a rack-like gauging member carried by said swivel plate, and indicating means for indicating the instantaneous angular position of said swivel plate.

2. Gauging apparatus for large gears comprising a frame, a rotary gear support on said frame for mounting a large gear to be gauged in fixed position during the gauging operation, a carriage movable on said frame radially of said gear support, a slide movable on said carriage in a direction parallel to the axis of the gear, manually operated traverse means for traversing said slide on said carriage, a sub-slide freely movable on said slide during traverse thereof in a direction perpendicular to the gear axis and perpendicular to the direction of movement of said carriage, a swivel plate movable on said sub-slide during traverse of said slide on said carriage about an axis parallel to the direction of movement of said carriage, a rack-like gauging member carried by said swivel plate, indicating means for indicating the position of said carriage on said frame, and indicating means for indicating the angular position of said swivel plate.

3. Gauging apparatus for large gears comprising a frame, a rotary gear support on said frame for mounting a large gear to be gauged in fixed position during the gauging operation, a carriage movable on said frame radially of said gear support, a slide movable on said carriage in a direction parallel to the axis of the gear, manually operated traverse means for traversing said slide on said carriage, a sub-slide movable on said slide during traverse thereof in a direction perpendicular to the gear axis and perpendicular to the direction of movement of said carriage, a swivel plate freely movable on said sub-slide during traverse of said slide on said carriage about an axis parallel to the direction of movement of said carriage, a rack-like gauging member carried by said swivel plate, indicating means for indicating the position of said carriage on said frame, and resilient means urging said carriage toward the gear being gauged.

4. Gear gauging apparatus comprising a frame, a rotary gear support on said frame to mount a gear in stationary position during a gear gauging operation, a carriage movable on said frame radially of the axis of said gear support, yieldable means urging said carriage toward said gear support, a slide movably mounted on said carriage for movement parallel to the axis of said gear support, manually operable traverse mechanism between said carriage and slide, a sub-slide freely movable on said slide during traverse of said slide in a direction perpendicular to the axis of said gear support and perpendicular to the direction of movement of said carriage, a rack support on said sub-slide freely movable thereon during traverse of said slide about an axis parallel to the direction of movement of said carriage, first gauge means including an indicator acting between said frame and said carriage, second gauge means including an indicator acting between said sub-slide and said rack support.

5. Gear gauging apparatus comprising a frame, a rotary gear support on said frame to mount a gear in stationary position during a gear gauging operation, a carriage movable on said frame radially of the axis of said gear support, yieldable means urging said carriage toward said gear support, adjustable abutment means acting between said frame and said carriage limiting movement of said carriage toward said support, a slide movably mounted on said carriage for movement parallel to the axis of said gear support, manually operable traverse mechanism between said carriage and slide, a sub-slide freely movable on said slide during traverse of said slide in a direction perpendicular to the axis of said gear support and perpendicular to the direction of movement of said carriage, a rack support on said sub-slide freely movable thereon during traverse of said slide about an axis parallel to the direction of movement of said carriage, first gauge means including an indicator acting between said frame and said carriage, second gauge means including an indicator acting between said sub-slide and said rack support.

6. Gear gauging apparatus comprising a frame, a rotary gear support on said frame to mount a gear in stationary position during a gear gauging operation, a carriage movable on said frame radially of the axis of said gear support, yieldable means urging said carriage toward said gear support, a slide movably mounted on said carriage for movement parallel to the axis of said gear support, manually operable traverse mechanism between said carriage and slide, a sub-slide freely movable on said slide during traverse of said slide in a direction perpendicular to the axis of said gear support and perpendicular to the direction of movement of said carriage, a rack support on said sub-slide freely movable thereon during traverse of said slide about an axis parallel to the direction of movement of said carriage, first gauge means including an indicator acting between said frame and said carriage, second gauge means including an indicator acting between said sub-slide and said rack support, and third gauge means including an indicator acting between said carriage and said slide.

7. Gear gauging apparatus comprising a rotary gear support, a gauge support to mount a gear in stationary position during a gear gauging operation, means providing for relative movement between said supports along a path radial of said gear support, a slide on said gauge support movable thereon in a direction parallel to the axis of said gear support, manually operable traverse means for moving said slide on said gauge support, a sub-slide on said slide freely movable thereon during traverse movement of said slide in a direction perpendicular to the axis of the gear support and to said path, a swivel plate mounted for free angular movement on said sub-slide during traverse movement of said slide about an axis parallel to said path, a rack section on said swivel plate, and a first indicator positioned to be actuated by relative movement between said supports along said path.

8. Gear gauging apparatus comprising a rotary gear support, a gauge support to mount a gear in stationary position during a gear gauging operation, means providing for relative movement between said supports along a path radial of said gear support, a slide on said gauge support movable thereon in a direction parallel to the axis of said gear support, manually operable traverse means for moving said slide on said gauge support, a sub-slide on said slide freely movable thereon during traverse of said slide in a direction perpendicular to the axis of the gear support and to said path, a swivel plate mounted for free angular movement on said sub-slide during traverse of said slide about an axis parallel to said path, a rack section on said swivel plate, a first indicator positioned to be actuated by relative movement between said supports along said path, and a second indicator positioned to be actuated by movement of said swivel plate about its axis.

(References on following page)

References Cited in the file of this patent

UNITED STATES PATENTS

| | | |
|---|---|---|
| 2,369,477 | Martin | Feb. 13, 1945 |
| 2,447,445 | Widen | Aug. 17, 1948 |
| 2,669,028 | La Femina | Feb. 16, 1954 |

FOREIGN PATENTS

| | | |
|---|---|---|
| 460,008 | Great Britain | Jan. 19, 1937 |

OTHER REFERENCES

American Machinist, pp. 97 and 98, February 18, 1943.
Machine Design, pp. 128–130, June 1948.